(12) United States Patent
Gire et al.

(10) Patent No.: US 10,902,308 B2
(45) Date of Patent: Jan. 26, 2021

(54) DEVICE FOR DYNAMICALLY GENERATING AND DISPLAYING A SECURITY CODE

(71) Applicant: PARAGON ID, Mougins (FR)

(72) Inventors: Claude Gire, Le Bar sur Loup (FR); Olivier Parrault, Antibes (FR); Guillaume Brandin, Roquefort les Pins (FR); Eric Gerbault, Vence (FR); Julien Zuccarelli, Paris (FR); Gilles Martinez, Cannes (FR); Fabien Guichon, Grasse (FR)

(73) Assignee: PARAGON ID, Mougins (FR)

( * ) Notice: Subject to any disclaimer, the term of this patent is extended or adjusted under 35 U.S.C. 154(b) by 105 days.

(21) Appl. No.: 16/302,871

(22) PCT Filed: May 19, 2017

(86) PCT No.: PCT/EP2017/062157
§ 371 (c)(1),
(2) Date: May 3, 2019

(87) PCT Pub. No.: WO2017/198842
PCT Pub. Date: Nov. 23, 2017

(65) Prior Publication Data
US 2019/0251411 A1    Aug. 15, 2019

(30) Foreign Application Priority Data

May 20, 2016    (FR) ..................................... 16 54553

(51) Int. Cl.
*G06K 19/073*    (2006.01)
*G06K 19/07*    (2006.01)
(Continued)

(52) U.S. Cl.
CPC ............. *G06K 19/073* (2013.01); *G06K 5/00* (2013.01); *G06K 19/0708* (2013.01);
(Continued)

(58) Field of Classification Search
CPC ........ G06K 19/00; G06Q 20/20; G06Q 20/34; G06Q 20/40
(Continued)

(56) References Cited

U.S. PATENT DOCUMENTS

2008/0034221 A1\* 2/2008 Hammad ........... G06Q 20/3821
713/190
2008/0197201 A1    8/2008 Manessis et al.
(Continued)

OTHER PUBLICATIONS

International Search Report from corresponding International Application No. PCT/EP2017/062157, dated Jun. 29, 2017, pp. 1-2, European Patent Office, Rijswijk, The Netherlands.

*Primary Examiner* — Edwyn Labaze
(74) *Attorney, Agent, or Firm* — Hauptman Ham, LLP

(57) ABSTRACT

A device comprising a physical support and an electronic chip supported by the support and comprising a memory module and a processor configured to implement a computer program configured to produce a result from data. The device further comprises a display module configured to display the result and a radio antenna configured to receive at least one electromagnetic signal configured to electrically supply the display module. The data comprises at least one item of static data, stored in a non-transient memory and an item of dynamic data, circulating in a transient memory. The dynamic data is received by the device through the at least one electromagnetic signal and the at least one electromagnetic signal is received by the device from at least one communication device.

20 Claims, 3 Drawing Sheets

(51) Int. Cl.
*G06K 19/077* (2006.01)
*G06Q 20/34* (2012.01)
*G06K 5/00* (2006.01)
*G07F 7/08* (2006.01)
*H04L 9/32* (2006.01)

(52) U.S. Cl.
CPC ..... *G06K 19/07707* (2013.01); *G06Q 20/341* (2013.01); *G07F 7/0846* (2013.01); *G07F 7/0866* (2013.01); *H04L 9/3297* (2013.01)

(58) Field of Classification Search
USPC ................................ 235/380, 492, 375, 487
See application file for complete search history.

(56) References Cited

U.S. PATENT DOCUMENTS

| | | | |
|---|---|---|---|
| 2008/0201264 A1* | 8/2008 | Brown | G07F 7/1016 705/67 |
| 2009/0159663 A1* | 6/2009 | Mullen | G06K 7/10297 235/379 |
| 2011/0140841 A1* | 6/2011 | Bona | G07F 7/0846 340/5.83 |
| 2012/0318863 A1 | 12/2012 | Kim | |
| 2016/0148194 A1 | 5/2016 | Guillaud et al. | |
| 2018/0039987 A1* | 2/2018 | Molino | G06Q 20/34 |

* cited by examiner

DEVICE FOR DYNAMICALLY GENERATING AND DISPLAYING A SECURITY CODE

TECHNICAL FIELD OF THE INVENTION

The present invention relates to the field of chip cards or related, having to provide a dynamic item of information transmitted to the carrier through a device for displaying or other, for example bank cards having a dynamic security code.

STATE OF THE ART

In the field of bank security, the manufacturers of bank cards prove a certain resourcefulness, however limited in practice, both from a software and a hardware point of view.

Indeed, facing the possibility of copying a security code for example, the manufacturers of cards have implemented cards of which the security code, commonly called cryptogram or CVV ("Card Verification Value"), is no longer a static item of data printed on the card, but a dynamic item of data generated by the card at the time of the confirmation of a bank transaction and displayed on a screen, most often comprised in the card itself.

This new type of bank card thus brings a degree of additional security, but at the price of an increased complexity in production. Indeed, as presented in document US 2014/0279555 A1, these dynamic security code cards now comprise a display screen, a supply battery and generally a button triggering the generation of a new security code from static data contained in a memory block of the card and dynamic data also coming from an electronic module comprised in the card. This dynamic data is most often time stamping data supplied by a clock inside the bank card.

Although these cards of a new type bring an additional security level, the theft thereof forbids nothing in the generation of a new code for the fraudulent use of the stolen card.

Thus, facing this disadvantage, certain card manufacturers have added an additional security level. This is a personal code that the user must enter by way of a keyboard type device comprised by the bank card. Once this personal code is entered, a new dynamic security code is generated and displayed on the card. This additional degree of security tends to significantly complexify the production of these types of cards. The production cost is thus sacrificed in favour of security.

There is therefore a real problem at the level of the production cost and the design of dynamic security code bank cards having a security against the theft of the card itself.

The present invention resolves, at least partially, these two problems, which are the security and the design of dynamic security code bank cards.

SUMMARY OF THE INVENTION

The present invention relates to a device comprising a physical support and, carried by said support, at least one electronic chip comprising at least one memory module and at least one processor configured to implement at least one computer program contained in (or stored on) the at least one memory module, said computer program being configured to produce at least one result from data, said device comprising at least one display module configured to display said at least one result, said device being characterised in that it comprises at least one radio antenna configured to receive at least one electromagnetic signal, said at least one electromagnetic signal being configured to electrically supply said display module.

The present invention makes it possible to remove any type of energy storage from the device by making it possible for the supply thereof by an external source in the form of electromagnetic waves. The present invention is thus energised by an electromagnetic wave and ensures calculation and information display functions without requiring any battery or energy storage. This makes it possible thus for the industrial production of the present invention simply, reliably and inexpensively.

The use of batteries has shown problems with pollution, recycling and safety of goods and people.

The invention makes it possible to integrate a display unit on a card without even requiring an electrical storage on it for this purpose, which could initially seem incompatible.

Numerous fields of application can be considered:
Displaying a dynamic security code;
Displaying a number of points of a driving licence;
Displaying an electronic wallet balance;
Displaying a contract on a travel card;
Displaying loyalty points;
Displaying a validity date.

Generally, the present invention has an application in displaying any unit of value or time on a support not having an energy storage.

In the case of bank cards, the present invention makes it possible for the generation of a dynamic security code at the level of a display unit of the card itself without resorting to a battery or any other energy storage means.

Indeed, the present invention facilitates the design and the lifespan of dynamic security code display bank cards by subtracting any energy storage from the card itself.

This advantage is obtained by an external supply in the form of electromagnetic waves emitted by a communication device carrying (or not) any type of electronic or mobile telephone terminal, for example.

The present invention thus makes it possible for a wireless, battery-free and storage module-free supply of a device, preferably a bank card, with dynamic information display.

From a security point of view and depending on the preferred case of the present invention, the displaying of a dynamic security code no longer requires only the bank card itself, but also the portable communication device of the user, which now makes the theft of the bank card by itself useless in the case where the energisation of the card and the transfer of dynamic data require a device to be specific to the user.

Indeed, advantageously, a pairing is made between said bank card and the smartphone of the user, for example. This pairing preferably requires an access code specific to the user, such that the energisation of the card and the transfer of dynamic data, and therefore the generation of a dynamic security code, can only be done from a portable communication device paired with said bank card by the user.

The data comprises at least one item of data called static, stored in a non-transient memory and at least one item of data called dynamic, circulating in a transient memory. The at least one radio antenna is configured to receive at least one electromagnetic signal comprising said at least one item of dynamic data.

This makes it possible to transfer external data to the chip, while supplying said chip by an electromagnetic wave. This external data brings a dynamic to the static data contained in the chip and ensure an increased level of encryption.

The present invention also relates to a system comprising at least one device, such as introduced above and at least one communication device, preferably portable, configured to emit, sent to the at least one device, at least one electromagnetic signal configured to supply said at least one device and to transmit at least one item of dynamic data to said at least one device.

The present invention also relates to a method for creating a security code for the confirmation of a bank payment implemented by at least one user from at least one device according to the present invention comprising at least one electronic chip and at least one display module and from at least one IT server, and at least one communication device in communication with said at least one IT server, said method being characterised in that it comprises at least the following steps:

The device is brought to a radiofrequency communication range with at least one communication device, preferably portable, by said at least one user;

The device receives at least one electromagnetic signal emitted by said at least one portable communication device, said at least one electromagnetic signal being configured to electrically supply said at least one display module;

Said electronic chip generates, from static data and from dynamic data, a security code;

The device displays said new security code on the display module thereof, said dynamic data being transmitted to said device by said at least one electromagnetic signal.

The present invention thus makes it possible for the simpler, less expensive design of the dynamic security code display bank card, and of which the lifespan is increased by the absence of any battery, mainly. In addition, the present invention brings an additional degree of security to trigger the generation of a new security code, making the theft of the bank card by itself useless.

BRIEF DESCRIPTION OF THE FIGURES

The aims, objectives, as well as the characteristics and advantages of the invention will best emerge from the detailed description of an embodiment of the latter, which is illustrated by the following supporting drawings, wherein.

Figure 1:
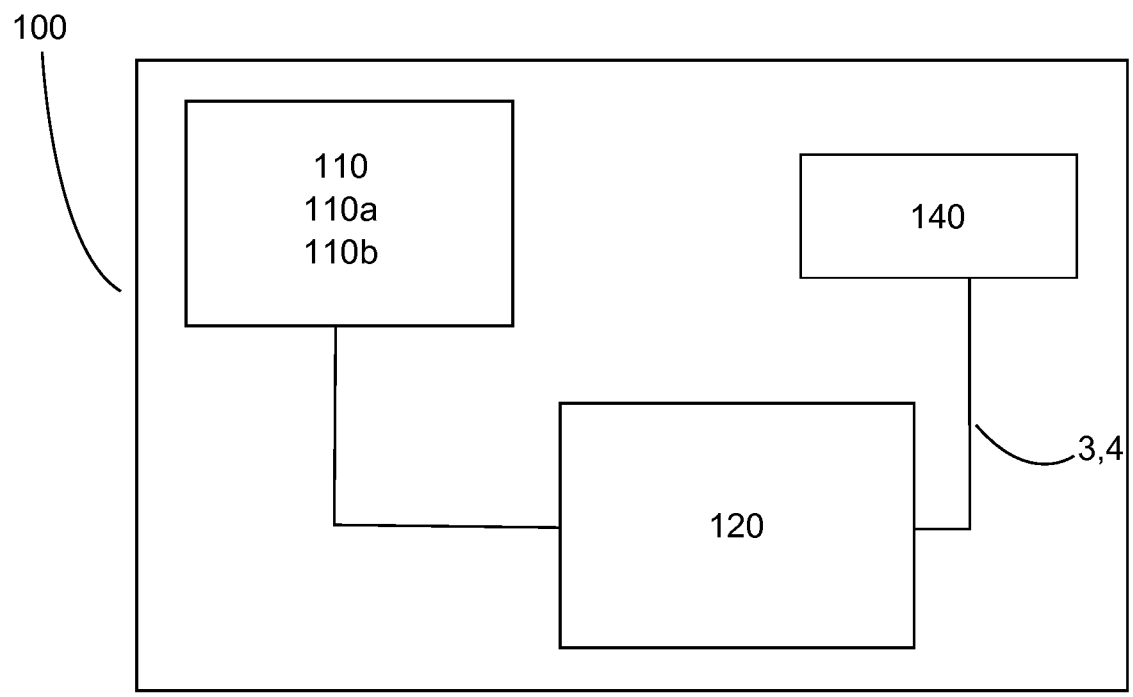
FIG. 1 illustrates a first embodiment of the present invention.

The appended drawings are given as examples and are not limiting of the invention. These drawings are schematic representations and are not necessarily to the scale of the practical application.

DETAILED DESCRIPTION OF THE INVENTION

It is specified that in the scope of the present invention, the term "contactless" or the equivalents thereof have, as a definition, the putting into wireless communication between a bank card and a bank card reader by transmitting electromagnetic waves are thus made "without contact".

It is specified that in the scope of the present invention, the term "put into contact" or the equivalents thereof have, as a definition, the putting into communication of two elements with one another, for example the putting into contact of a bank card and a bank card reader means the establishment of a wired or non-wired communication link making it possible for the exchange of data unilaterally or bilaterally.

It is specified that in the scope of the present invention, the terms "contactless payment", "contactless transaction" or the equivalents thereof have, as a definition, the fulfilment of a bank card or a bank transaction from a bank card without any introduction of the bank card or of a part of the bank card in a chip reader or magnetic strip, for example. Therefore, this is a transfer of information via one or more electromagnetic waves.

It is specified that in the scope of the present invention, the terms "contact payment", "contact transaction" or the equivalents thereof have, as a definition, the fulfilment of a bank payment or of a bank transaction from a bank card with the introduction of the bank card or a part of the bank card into a chip reader or magnetic strip, for example. Therefore, this is a transfer of information via an electrical current through an electrical circuit, such as electrical cables.

It is specified that in the scope of the present invention, the term "static data" or the equivalents thereof have, as a definition, data contained in a non-transient memory, for example of the memory type called flash or ROM ("Read-Only Memory"). This type of data is also characterised by the constant character thereof over time. It can be, for example, name-type, forename-type, birth date-type, expiry date-type, bank card number-type data.

It is specified that in the scope of the present invention, the term "dynamic data" or the equivalents thereof have, as a definition, data contained in a transient memory. This type of data is also characterised by the developing character thereof over time, it can be, for example, time-type data like time stamping. According to an alternative, by "dynamic data", or the equivalents thereof means any data not present in the device according to the present invention before the putting into radiofrequency communication thereof with at least one portable communication device, or any data coming from said portable communication device and received by said device according to the present invention.

By "series transmission", this means a method of transmitting data according to which the information elements succeed one another, one after the other, on one single communication path between two electronic circuits.

By "pulse", this means a brief and quick variation of an electrical signal.

Before starting a detailed review of embodiments of the invention, are stated below of the optional characteristics which can possibly be used in association or alternatively:

According to an embodiment, said at least one result is an encrypted security code, and the device is a bank card. This makes it possible to have a dynamic encrypted security code and requiring the use of a smartphone-type external device to be renewed.

Advantageously, said static data comprises at least one from among: name of the user, date of birth of the user, bank card number, date of validity of the bank card, bank code, account number.

Advantageously, said static data is recorded in a memory module by a bank or a financial body.

Advantageously, said dynamic data comprises at least one from among: a time stamping, preferably GMT ("Greenwich Mean Time"), an encryption key, an unlocking key, a random number.

Advantageously, said at least one electronic chip is supplied electrically from said at least one radio antenna.

This makes it possible to not use any battery or energy storage system, thus facilitating the design of the present invention, reducing the production costs thereof and extending the lifespan thereof.

Advantageously, said at least one display module is supplied electrically through said at least one electrical chip.

This makes it possible to not use any battery or energy storage system, thus facilitating the design of the present invention, reducing the production costs thereof and extending the lifespan thereof.

Advantageously, said at least one display module is directly supplied electrically from said at least one radio antenna.

This makes it possible to use numerous electronic chips, different through the design thereof independently of the supply of the display module.

According to an embodiment, said at least one display module is supplied electrically by an electrical energy conversion module, and said electrical energy conversion module is supplied electrically by said at least one radio antenna.

This makes it possible to use numerous electronic chips, different through the design thereof independently of the supply of the display module.

Advantageously, said electrical energy conversion module supplies electrically only said at least one display module.

This makes it possible to use numerous electronic chips, different through the design thereof independently of the supply of the display module.

According to an embodiment, the at least one electronic chip comprises said energy conversion module, and said electrical energy conversion module directly supplies electrically said processor and indirectly, said at least one display module.

This makes it possible to minimise the number of components in the device making the production thereof simpler, less expensive and more reliable.

According to an embodiment, the at least one radio antenna is the sole and only radio antenna comprised by said device.

This makes it possible to minimise the number of components in the device making the production thereof simpler, less expensive and more reliable.

According to an embodiment, the device comprises at least one other radio antenna.

This makes it possible to receive electromagnetic signals over a plurality of frequencies simultaneously.

According to an embodiment, the at least one display module is taken from among: an e-paper screen, an electronic ink screen, a liquid crystal screen, an LED screen, an OLED screen, etc.

Advantageously, the at least one display module is an e-paper screen.

This type of screen only requires a very low energy to function, thus ensuring the present invention, partially at least, the independence thereof to a local energy storage of battery type, for example.

The electronic chip and the display module are connected to one another via an electrical connection line and a mass line common to the electronic circuits that constitute the electronic chip and the display module, for the transmission, from the electronic chip to the display module, via the electrical connection line and in reference to the mass line, of at least one series of pulses called data pulses, each data pulse making it possible to both electrically supply the display module and the transmit an item of data from a series of data which can be interpreted by the display module, the electronic chip being configured to cut the supply between two successive data pulses, and the display module comprising a non-volatile storage support configured to store the data transmitted by each data pulse before the display module turns off because of any supply defect. The device is thus particularly suitable for the series transmission of data from a first circuit to a second circuit, of which the continuous functioning is incidental, even to be avoided.

Advantageously, said at least one portable communication device is preferably at least one device from among: a smartphone, a tablet, a mobile telephone, a smartwatch, an electronic payment terminal, an RFID reader.

Advantageously, the putting into contact of the card with said communication device, preferably portable, corresponds to a convergence of the card and of said communication device, preferably portable, at a distance less than 1 m, preferably less than 10 cm and advantageously zero.

Advantageously, the user transmits to said IT server, said static data and said security code and the IT server compares said security code with said static data and dynamic data preferably corresponding to a time stamping, preferably GMT.

Advantageously, said communication device is taken from among at least: one computer, one smartphone, one tablet.

Advantageously, the data comprises at least one item of data called static, stored in a non-transient memory and at least one item of data called dynamic, circulating in a transient memory, and said at least one item of dynamic data is received by said device through the at least one electromagnetic signal comprising said at least one item of dynamic data, and the at least one electromagnetic signal is received by said device from at least one communication device.

Advantageously, said at least one result is an item of data displayed on the device, and the device is a chip card.

Advantageously, said at least one result is an encrypted security code, and the device is a bank card.

Advantageously, said dynamic data comprises at least one item of data taken from among: a time stamping, a cryptogram, a token, a unit of value.

Advantageously, said at least one electronic chip is supplied electrically from said at least one radio antenna.

Advantageously, said at least one electronic chip, is supplied electrically from an energy conversion module, and said energy conversion module is supplied electrically by said at least one radio antenna.

Advantageously, said at least one electronic chip comprises said energy conversion module.

Advantageously, said at least one display module is supplied electrically from an energy conversion module, and said energy conversion module is supplied electrically by said at least one radio antenna.

Advantageously, said at least one display module comprises said energy conversion module.

Advantageously, said at least one communication device is preferably at least one portable communication device taken from among: a smartphone, a tablet, a mobile telephone, a smartwatch, an electronic payment terminal, an RFID reader.

Advantageously, a software application is activated, on said communication device in order to emit said electromagnetic signal.

Advantageously, said dynamic data is transmitted to said device by said at least one electromagnetic signal.

The present invention finds, as a field of application, that of devices of, for example, card, badge or keyring type, which comprise a data display unit, preferably dynamic. For example, for security questions, certain companies use these types of devices to give access to computerised resources to accredited people and people who have these types of devices in order to confirm their access.

Another field of application can relate to the travel card sector, on which the present invention makes it possible to indicate, for example, in a non-limiting manner, the balance of the travel pass or the number of journeys made.

According to the field of application of the present invention, the static data, the dynamic data and the result can vary from one field of application to another, like as a communication device which can (or not) be portable, according once again to the field of application.

The possibilities of applications of the present invention are multiple and directly affect the field of cards or badges having a dynamic component to display, in order to inform the user and this, without resorting to an energy source or to an energy storage at the same level of the device in question.

A field directly in line with the present invention is the bank sector. The present invention can indeed relate to the field of bank cards comprising a security code also called a cryptogram, or CVV ("Card Verification Value").

According to an embodiment, the present invention relates to bank cards of which the dimensions respect the format described according to the standard ID-1.

For example, the present invention relates to bank cards called standard dimensions and having, for example, a physical reading chip as well as, for example, payment means called "contactless".

Indeed, the present invention advantageously relates to a bank card capable of carrying out bank transactions, contact or contactless, and having an additional functionality. Preferably, this additional functionality relates to the displaying of an item of data on the card itself without requiring having a battery inside or any type of energy storage inside.

The materials used to produce the device according to the present invention are mainly plastic-based materials.

One of the main problems resolved by the present invention, is the production of a display, with the removal or any energy storage means at the same level as the bank card for this, and this even in a functioning called "contactless".

Indeed, the present invention cleverly ensures the supply of the bank card such as a new cryptogram, for example, can be generated and displayed on said card.

The present invention takes advantage of a synergy between the different elements composing it, which are at least one radio antenna configured to receive an energisation signal and a display module configured advantageously to consume energy only when the displayed information is modified.

Advantageously, the present invention takes advantage of numerous resources that a communication device, preferably portable, can supply. Indeed, the present invention uses such a device, on the one hand, as a wireless electrical supply source, on the other hand, as a wireless data source, preferably dynamic.

The present invention will now be described as an example of embodiments in reference to FIGS. 1 to 4.

FIG. 1 illustrates a preferred embodiment of the present invention, wherein the device 100, a bank card as a non-limiting example, comprises at least one radio antenna 110, 110a electrically connected with at least one electronic chip 120.

According to an embodiment, the electronic chip 120 can be (or not) a bank chip, i.e. capable of making bank transactions (or not).

Indeed, according to an embodiment, the electronic chip 120 can be independent of an electronic bank chip already present in a bank card, for example. This makes it possible thus to adapt the present invention to devices requiring an electronic chip as well as a set of quite specific modules. Indeed, the present invention makes it possible to add the functionality for displaying data without any battery, nor energy storage to any device, while conserving, if needed, the elements already present at the level of the device in question. This versatility of the present invention makes it possible for the application thereof to sectors where the already existing electronic chips must be conserved for security questions, for example, as well as the addition of the electronic chip 120, of the display module 140 and of at least one antenna 110, 110a ensures the implementation of the present invention in high-level security sectors.

Particularly advantageously, the radio antenna 110, 110a makes it possible to receive an electromagnetic signal 220 configured to electrically supply the device 100. This supply by electromagnetic wave 220 thus makes it possible to be subtracted from the presence of a battery and even an electricity storage module at the level of the device 100.

Preferably, the radio antenna 110, 110a electrically directly supplies the electronic chip 120.

The whole of the device 100 is indeed configured to be supplied from at least one electromagnetic signal 220 generated by a portable communication device 200, it can be, for example, a smartphone. Advantageously, the present invention takes advantage of the resources available at the level of a portable communication device 200 that are at the energy level and/or at the data level, preferably dynamic.

According to an embodiment, the whole of the device 100 is configured to be supplied from at least one electromagnetic signal 220 generated by a communication device, it can be, for example, an Electronic Payment Terminal (EPT), or an electronic terminal.

Indeed, the present invention is intended to be supplied by an electromagnetic field coming from an external device wirelessly, this external device being advantageously a portable or non-portable communication device.

This electromagnetic wave 220 is configured to energise the device 100 by way of the at least one antenna 110, 110a which is designed so as to receive electromagnetic energy and to supply the electronic chip 120 in order to implement a computer program and to display, for example, a security code on the display module 140.

According to this embodiment, the antenna (110, 110a) electrically supplies the electronic chip 120 which electrically supplies the display module 140.

Advantageously, this display module 140 is an e-paper type screen or designed with an electronic ink base, and more generally, a screen configured to be supplied only at the time when the display thereof changes, but which makes it possible to maintain a display when it is no longer supplied.

According to an embodiment of the display module 140 is controlled by a microcontroller, not represented in the figures. This microcontroller can be integrated to the electronic chip 120, or to the display module 140 itself, or also be a full module, preferably situated electrically between the electronic chip 120 and the display module 140.

Advantageously, the electronic chip 120 comprises at least one processor and at least one memory module. Said processor is thus preferably configured to execute at least one computer program contained in the at least one memory module.

Preferably, said computer program is configured to generate a result, for example, a security code.

According to an embodiment, said computer program is an encrypting program configured to generate a result from data called static and data called dynamic.

For example, in the case of the implementation of the present invention in the banking sector, the static data can comprise the bank card number, the expiry date thereof, a random number, the name of the user of the card, and the dynamic data can, itself, preferably comprise a time stamping and advantageously a GMT (Greenwich Mean Time) time stamping. Said computer program thus uses this static and dynamic data in order to generate a cryptogram, this cryptogram is thus called dynamic, since it is brought to change a security code at each generation. Indeed, at each implementation of the present invention, a new result, for example, a new cryptogram, is generated and displayed.

According to an embodiment, the dynamic data can be, for example, an unlocking key, an encryption key, an item of time stamping data, a random number.

The static data is advantageously contained in the memory module comprised by the electronic chip 120. Concerning the dynamic data, it is advantageously transmitted to the electronic chip 120 by way of the radio antenna 110, 110b through an electromagnetic signal 220.

According to a preferable embodiment, this electromagnetic signal 220 is emitted from a communication device 200 of electronic terminal or smartphone type, for example.

According to a preferred embodiment, the communication device 200 is a portable communication device 200.

According to an embodiment, the portable communication device 200 comprises at least one processor, at least one non-transient memory, at least one battery and at least one antenna, capable of emitting at least one electromagnetic signal 220 configured to energise the device 100 and to transmit dynamic data to it.

The portable communication device 200 advantageously comprises communication means over wi-fi, GSM, 3G, 4G, 5G communication networks, for example.

The portable communication device 200 preferably comprises a display screen making it possible to display information.

According to a preferred embodiment of the present invention, the portable communication device 200 is a smartphone comprising radiofrequency communication means, of NFC and/or RFID type, for example.

According to an embodiment, one same electromagnetic signal 220 electrically supplies the device 100 and transmits dynamic data.

According to a preferred embodiment, the electromagnetic signal 220 directly supplies the electronic chip 120 and indirectly, the display module 140.

According to an embodiment, the device 100 can comprise a plurality of radio antennas 110, 110a, 110b in order to receive or emit over different frequencies.

According to another embodiment, the radio antenna 110b can be used to receive an electromagnetic signal 220 electrically supplying the present invention and transmitting dynamic data, while the other radio antenna 110b ensures conventional contactless payment functions, for example in the case where the device 100 is a bank card.

Once the cryptogram generated by the computer program executed by the electronic chip 120, the present invention makes it possible for the displaying thereof on the display module 140 contained in the device 100. Through the design thereof, the present invention can only require energy at the time of the implementation of the computer program and of the modification of the displaying of the cryptogram by the display module 140. Indeed, selecting the display module 140 can make it possible for a constant display without energy and only requires energy at the modification of the result displayed.

According to an embodiment, the display module 140 is controlled by the electronic chip 120, preferably by way of a microcontroller.

Advantageously, the display module 140 can display various information, like for example, the balance of the bank card, the number of uses of the bank card, the dynamic cryptogram, balance of a number of points, balance of a travel card.

Figure 2:
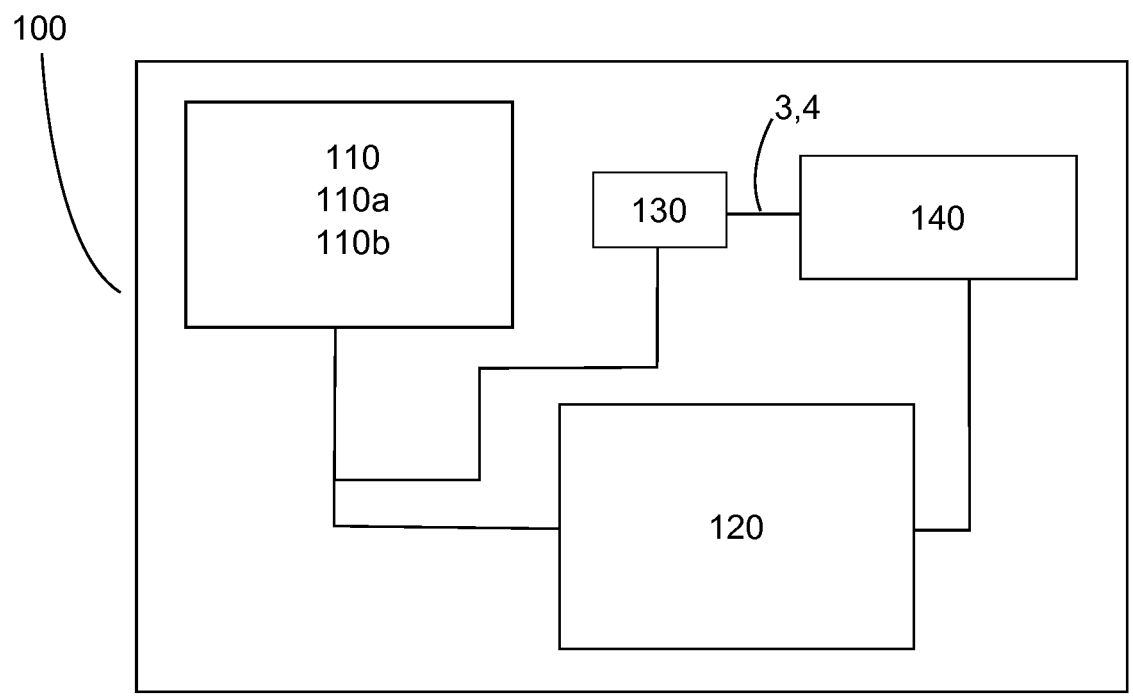
FIG. 2 illustrates a second embodiment of the present invention.

According to another embodiment illustrated by FIG. 2, the device 100 can comprise an energy conversion module 130 in order to electrically supply the display module 140 from the radio antenna 110, 110a, 110b. Subsequently, the electronic chip 120 can only control the display of the display module 140 by communicating the display data to it. According to a variant, the conversion module 130 can ensure both the supply of the display module 140 and the transmission of data to be displayed by the display module 140; if necessary, the transmission of data is managed by the conversion module 130 controlled by the electronic chip 120.

The conversion module 130 gives a greater flexibility to the embodiment of the present invention relating to selecting components, both at the level of the electronic chip 120 and at the level of the display module 140 and of the radio antenna 110, 110a, 110b. This energy conversion module 130 can, in particular, make it possible to decouple the electrical supply of the display module 140 and the electrical supply of the electronic chip 130 thus giving a greater flexibility in the industrialisation of the present invention.

According to another embodiment, the energy conversion module 130 can be integrated to the electronic chip 120.

According to another embodiment, the energy conversion module 130 can be integrated to the display module 140.

Figure 3:
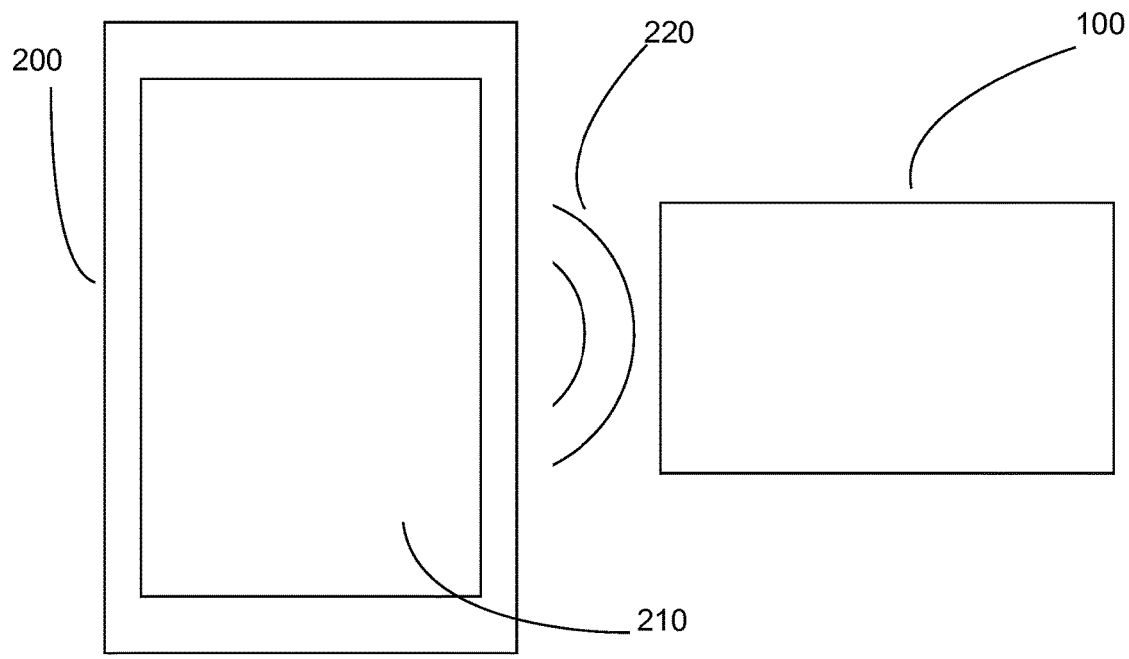
FIG. 3 illustrates the step of emitting from a smartphone to the present invention of an electromagnetic signal according to an embodiment of the present invention.

FIG. 3 illustrates, according to an embodiment of the present invention in the banking sector, a system comprising a device 100 according to the present invention and a portable communication device 200. This figure is an illustrative example of the generation of a cryptogram and of the display thereof at the level of the display module 140 of a bank card 100 according to the present invention. In this FIG. 3, the user of the bank card 100 uses a portable communication device 200, for example their smartphone, to emit one or more electromagnetic signals 220 sent to the bank card 100 from a software application 210 for example active on the smartphone 200.

According to an embodiment, the user has paired their bank card 100 with their smartphone 200.

According to an embodiment of the present invention, this pairing enables for only the smartphone 200 of the user to be able to trigger the generation of a cryptogram at the level of the bank card 100. This makes it possible to increase the security level.

According to an embodiment, the user launches an application 210 on their smartphone 200, they can, for example, enter a personal code in order to unlock this application 210.

According to an embodiment, the application 210 is configured such that the user can initialise the generation of a cryptogram in order to be able to read it on their bank card 100.

For this, the application 210 can trigger the generation from the smartphone 200 of the user of one or more electromagnetic signals 220, configured on the one hand to supply the display module 140 of the bank card 100 and/or the electronic chip 120 thereof, on the other hand to transmit dynamic data, and preferably time stamping data advantageously according to the GMT system.

This energy and this data are thus received by at least one antenna 110, 110*a*, 110*b* arranged in the bank card 100. From this energy and from this data, a cryptogram is generated by the computer program contained in the electronic chip 120. The display module 140 is controlled by the electronic chip 120 which uses this energy, partially at least, in order to modify the information displayed by the display module in order to display the cryptogram which has just been generated.

Such that the bank card 100 is able to receive this or these electromagnetic signals 220, this must be put into contact, i.e. in the radiofrequency communication range, with the smartphone. This communication range is specific to the type of radiofrequency technology used.

According to an embodiment, the device can be produced according to the technical characteristics described in the standard ISO 14443 and/or the energy necessary for the functioning of said device is supplied by at least one electromagnetic signal of which the characteristics are described in the standard ISO014443.

Figure 4:
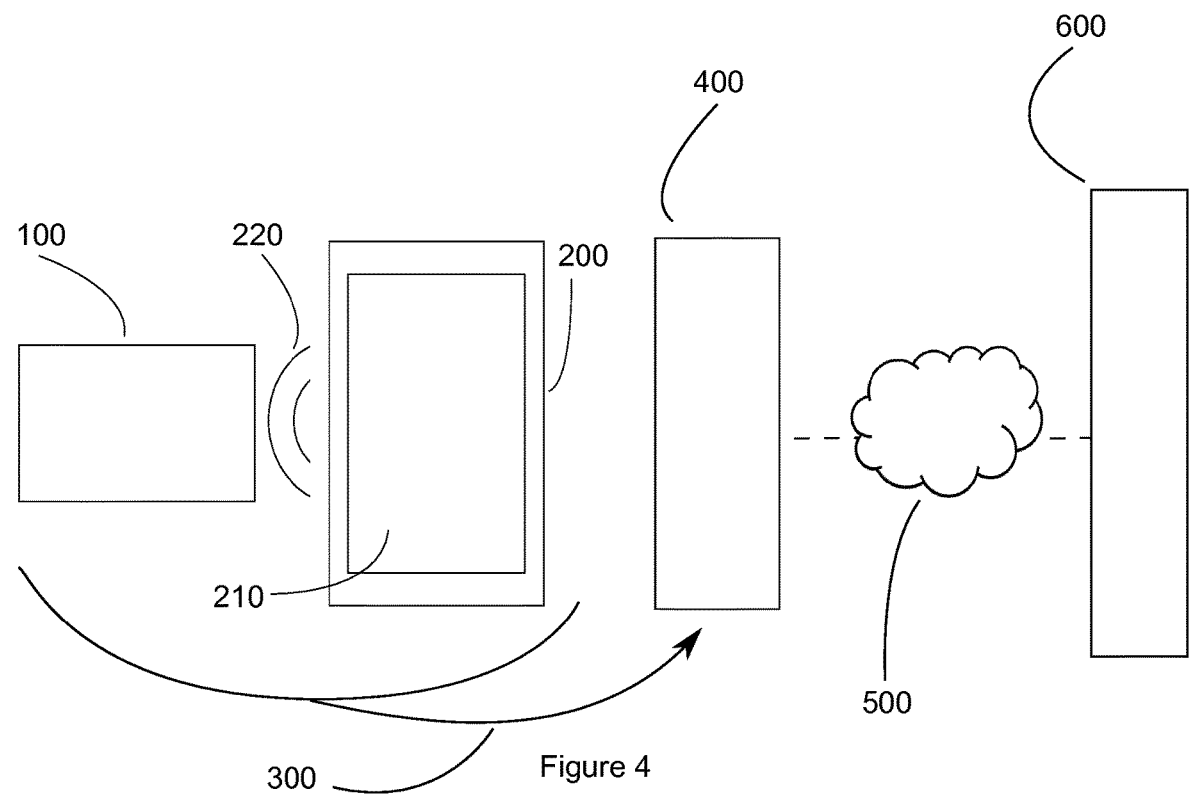
FIG. 4 illustrates an implementation, according to an embodiment, of the present invention.

FIG. 4 illustrates, according to the present invention, a method for creating a security code for the confirmation of a bank payment implemented by a user from a bank card 100 according to the present invention, from a smartphone 200 for example, from a computer 400 and from a bank IT server 600 through an internet-type communication network 500, for example.

According to an embodiment, the user uses the bank card 100 thereof in synergy with their smartphone 200 in order to generate a cryptogram for the confirmation of an online payment from a computer 400 on a website, for example.

According to a preferred embodiment, a software application is activated on the smartphone in order to prepare the emission of the energising electromagnetic wave and of the at least one item of dynamic data.

The generation of this cryptogram is advantageously done as follows:

The bank card 100 is brought to the radiofrequency communication range with the smartphone 200 of the user;

The bank card 100 receives at least one electromagnetic signal 220 emitted by the smartphone 200 of the user, the electromagnetic signal 220 being configured to electrically supply a display module of the bank card and to transmit dynamic data from the smartphone 200 to the bank card 100;

An electronic chip 120 present in the bank card 100 and supplied by the electromagnetic signal 220 generates, from static data and dynamic data, a cryptogram;

The bank card 100 thus displays the cryptogram calculated on the display module 140 thereof controlled by the electronic chip 120.

Once the user is in possession of this cryptogram, they supply said website with their bank details, of the name, bank card number and expiry date type and the calculated cryptogram.

This information is thus transmitted through a communication network 500, for example through the internet, and is received by a bank IT server 600 for verification. This bank IT server 600 ensures a payment confirmation function by evaluating the banking data of the user and by calculating a cryptogram from this static data and a GMT time stamping. If this cryptogram corresponds or is consistent with that supplied by the user, thus the payment is validated; otherwise, the payment is not validated. The use of a time stamping, here GMT, thus ensures a common time calculation base.

According to an embodiment, in order to consider the time difference between the generation of the cryptogram at the level of the bank card 100 and the evaluation thereof at the level of the bank IT server 600, this can use prior GMT time stamping in order to validate the banking transaction over a non-instantaneous time window, this considering a possible time difference. This window of difference being a parameter, adjustable at the level of bank IT server 600 itself.

The present invention thus makes it possible, on the one hand, to simplify the production of dynamic cryptogram bank cards, to decrease the production cost thereof and to increase the security level thereof by decoupling the static and dynamic data necessary for the generation of a dynamic cryptogram.

Figure 5:
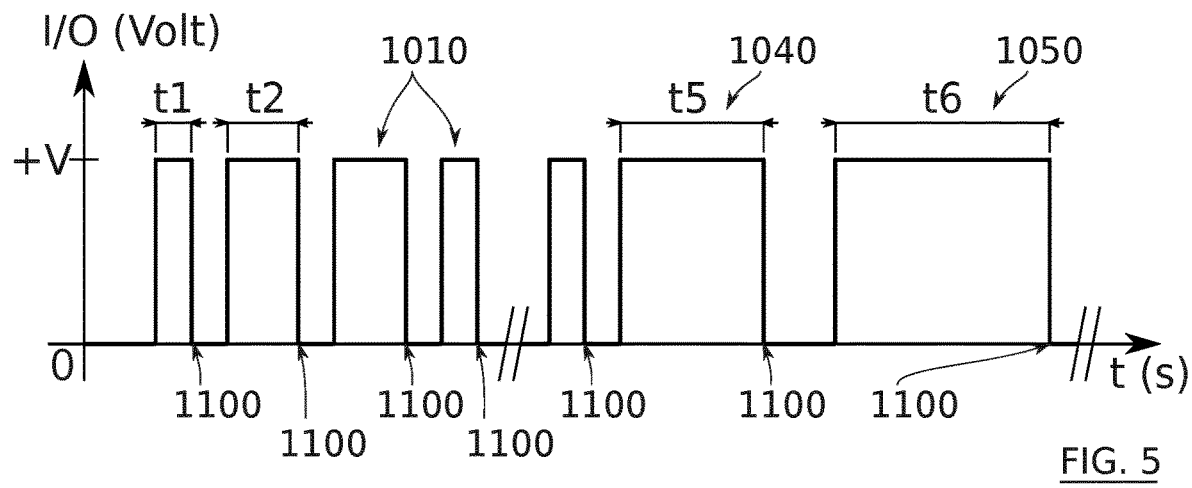
FIG. 5 schematically illustrates an embodiment of a method of series transmission implemented in a device (chip card) according to an embodiment of the invention.
Figure 6:
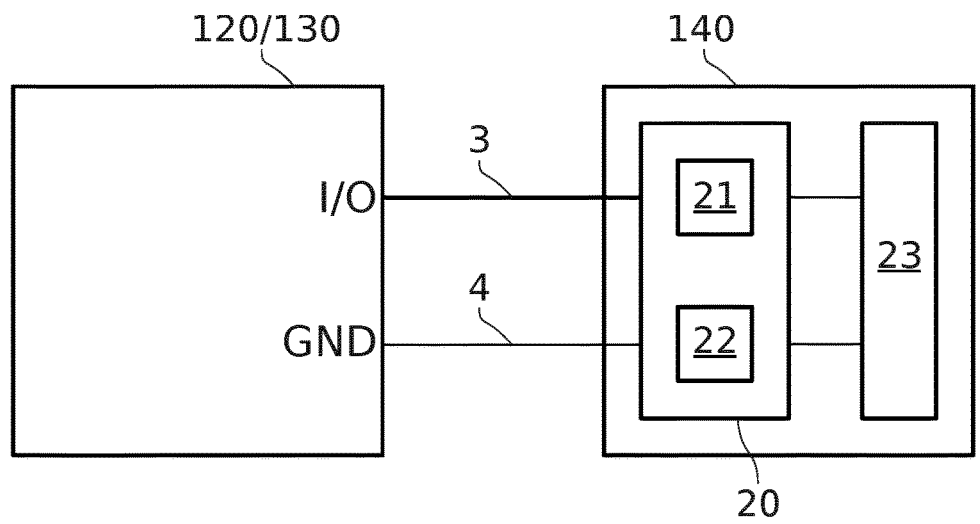
FIG. 6 schematically represents a series transmission system that comprises the device (chip card) according to an embodiment of the invention.

According to another aspect, and in reference to FIGS. 5 and 6, the invention makes it possible for a series transmission of data method comprising:

the transmission, from a first electronic circuit comprising the chip 120 of the conversion module 130, to at least one second electronic circuit, comprising the module for displaying 140 binary-type data, and the electrical supply of the second circuit by the first circuit, in reference to a mass line 4 common to the circuits, via one same electrical connection line 3.

Such that the conversion module 130 transmits the data and supplies the display module 140, it can, if necessary, communicate with the electronic chip 120, even be controlled by the electronic chip 120.

More specifically, at least one series of pulses called data pulses can be transmitted from the first circuit to the second circuit via the electrical connection line 3. Each data pulse makes it possible both to electrically supply the second circuit and to transmit an item of data of a series of data which can be interpreted by the second circuit. A series transmission system is associated with the abovementioned method.

The invention this finds a particularly advantageous application in the supply, to the carrier of a chip card, of an item of dynamic information, such as a dynamic security code (or CVV for "Card Verification Value"), through the transmission of data to display and the electrical supply of a display module 140, preferably with low electrical energy consumption, such as an electronic paper (or "e-paper") which has, furthermore, the advantage of not requiring any energy to leave a text or an image displayed.

In reference to FIG. 6, the device 100 can thus comprise a data series transmission system comprising:
- a first electronic circuit 120 or 130 and
- at least one second electronic circuit 140.

The first circuit and each second circuit are connected to one another via an electrical connection line 3 and a mass line 4 common to the circuits.

It is thus possible to transmit, from the first circuit to at least one second circuit, via the electrical connection line 3 and in reference to the mass line 4, at least one series of pulses called data pulses 1010 making it possible to both electrically supply the second circuit and to transmit an item of data of a series of data which can be interpreted by the second circuit.

To this end, the first circuit can comprise a switch for supplying the second circuit by the first circuit configured to cut the supply between two successive data pulses.

The second circuit can comprise a non-volatile storage support 21 configured to store the data transmitted by each data pulse 1010 before the second circuit switches off because of any supply defect.

In reference to FIG. 5, the transmission method implemented in the device 100 according to the invention comprising the data transmission system such as described above preferably comprises at least the following steps:
- cutting 1100 the supply of the second circuit 140 by the first circuit 120 or 130 between two successive data pulses 1010, and
- for each data pulse 1010 and before the second circuit does not switch off because of any supply defect, store, on a non-volatile storage support 21 of the second circuit 140, the item of data transmitted by this data pulse 1010.

Preferably, the cutting 1100 of the supply between two successive data pulses 1010 is configured such that the second circuit 140 switches off because of any supply defect.

The storage of data transmitted by the data pulses 1010 of one same series, even a succession of series, is configured so as to form a set of bits, even a set of bytes, coding a command which can be interpreted and executed by an integrated circuit 22 of the second circuit 140.

The functioning of the first circuit 120 or 130 with the second circuits 140 can in particular use a master-slave technology. The communication between the first circuit 120 or 130 and the second circuits 140 to obey an asynchronous protocol, which does not require to use a global clock signal to synchronise them.

More specifically, the second circuit 140 comprises a non-volatile storage support 21 and an integrated circuit 22, or processing means, which can, if necessary, be comprised in a microprocessor or a microcontroller 20 of the second electronic circuit 140. The non-volatile storage support 21 can, in particular, be a read-only memory which can be electrically deleted and which is programmable (also called EEPROM) or a mass memory with rewritable semi-conductors (or flash memory). The integrated circuit 22 integrates a timer giving the second circuit its own clock signal according to which it can discriminate between pulses of different durations to one another. The second circuit 140 also comprises a display screen 23 connected to the integrated circuit 22 of the second circuit 140.

The display module 140 preferably comprises an electronic paper or E ink screen which advantageously does not require any energy to leave a text or an image displayed and thus makes it possible, at each update of the electronic paper, for the text or image that it displays remains visible after the supply thereof by the first circuit 120 or 130 had been cut, and in particular, when the display module 140 is switched off because of supply defect.

However, the transmission system implemented in the device 100 according to the invention is not at all limited to this specific type of display module. In particular, the use of a display module requiring being continually supplied to display a text or an image, can be considered. It can be, for example, an organic light-emitting diode or OLED.

The data series transmission method according to the embodiment illustrated in FIG. 5 is more specifically described below. It comprises the transmission, from the first circuit 120 or 130 to at least one from among the second circuits 140, via the electrical connection line 3 between the first circuit and the second circuit, and in reference to a mass line 4 (GND) common to the circuits, of a series of pulses such as illustrated in FIG. 5. Below, a discussion "of" the second circuit will occur, without excluding that it can be "of said at least one" second circuit, and therefore several second circuits.

The series of pulses in particular comprises pulses called data pulses 1010. Each data pulse 1010 makes it possible both to electrically supply the second circuit and to transmit an item of data which can be interpreted by the second circuit. Each data pulse 1010 is therefore also a supply pulse.

After a certain time from the origin of the time axis illustrated in FIG. 5, the series of pulses first comprises a first data pulse 1010. This first data pulse 1010 is, for example configured to transmit an item of bit data equal to 0. More specifically, the first data pulse 1010 can be configured to have a first duration t1 corresponding to the item of bit data equal to 0. Once this first pulse duration t1 is reached, the method comprises a first cutting 1100 of the supply of the second circuit by the first circuit.

The first cutting 1100 is shown as arrows in FIG. 5 as being done at the moment immediately following the first duration t1. This illustration can therefore make the cutting appear as being instantaneous. However, the first cutting 1100 is potentially maintained over time, in particular so as to induce the stopping of the second circuit because of a supply defect.

It is understood that each cutting 1100 can last for a undetermined time. This time does not actually have other limits greater than those requires, or compatible with the sought application, the latter could necessarily be limited over time.

Preferably, before the first data pulse 1010 ends, and in any case, before the first cutting 1100 induces the stopping of functioning of the second circuit, the item of bit data equal to 0 transmitted via the first data pulse 1010 is stored on the non-volatile storage support 21 of the second circuit.

After the first cutting 1100, the series of pulses such as illustrated comprises a second data pulse 1010. This second data pulse 1010 is configured to transmit an item of bit data equal to 1. If necessary, the second data pulse 1010 has a second duration t2 corresponding the item of bit data equal to 1.

A second cutting 1100 is done, for example under one of the conditions described above, relative to the first cutting 1100.

Preferably, before the second data pulse 1010 ends, i.e. before the second cutting 1100 is done, the item of bit data equal to 1 transmitted via the second data pulse 1010 is stored on the non-volatile storage support 21 of the second circuit. The storage of the item of bit data equal to 1 transmitted via the second data pulse 1010 is done correlatively to the storage of the item of bit data equal to 0 transmitted via the first data pulse 1010.

The same thus applies for data pulses 1010 which follow, such that is stored, according to the example illustrated in FIG. 5, the series of bits: 0110 . . . 0, on the storage support 21 of the second circuit. This storage is done such that the series of bits is readable and can be interpreted by the integrated circuit 22 of the second circuit. The three small points integrated in this series of bits are connected to the fact that all of the series of data pulses 1010 is not necessarily illustrated in FIG. 5; some have been able to be omitted from this graphic representation to keep it brief. Indeed, the two lines, oblique and parallel to one another passing through the abscissa axis on the graph illustrated in FIG. 5 correspond to the non-illustration of a data pulse 1010, a series of data pulses 1010, even a succession of series of data pulses 1010, not represented. For this non-represented period, data can therefore have been transmitted which are in the series of bits represented above by the three small points.

As illustrated in FIG. 5, the series of pulses illustrated can then comprise a data pulse called control pulse 1040. This control data pulse 1040 is configured to transmit a control value of a data quantity. Said data quantity is, for example, that intended to be transmitted by the series of data pulses 1010. It can also correspond to the data quantity transmitted via the abovementioned succession of series. If necessary, the control data pulse 1040 has a fifth duration t5 corresponding to said control value.

This control value is stored on the storage support 21 of the second circuit, preferably before the control data pulse 1040 ends. It is intended, for example, to make it possible to control the validity of a coded command in the form of a series of bits, even a series of bytes, transmitted in the manner described above. This type of validity control of an item of information transmitted appears in a known protocol called "cyclic redundancy check" or CRC protocol. The method according to this particularity thus makes it possible at least to ensure that all expected data has been transmitted to the second circuit and stored on the storage support 21 thereof in a suitable manner. The method according to this particularity can also make it possible to verify that the command stored on the storage support 21 of the second circuit can be interpreted and executed by the integrated circuit 22 of the second circuit.

According to the embodiment illustrated in FIG. 5, the control data pulse is followed by a cut in supply 1100, then a pulse called processing pulse 1050. Like data pulses 101, this processing pulse 1050 is transmitted from the first circuit to the second circuit 2, via the electrical connection line 3 and in reference to the mass line 4. The processing pulse 1050 is distinguished from a data pulse 1010 in that it does not necessarily support an item of data intended to be stored on the storage support 21 of the second circuit. The processing pulse 1050 is, as its name indicates, intended to give an order of processing the command previously transmitted by the interpretation thereof and the execution thereof, possible preceded by the validation thereof. The processing pulse 1050 can be configured to transmit an order of processing said command. Preferably before it ends, and in any case, before the second circuit switches off because of supply defect, the command is interpreted and executed, and possibly validated beforehand, by the integrated circuit 22 of the second circuit. If necessary, the processing pulse 1050 has a sixth duration t6, for example greater, preferably strictly greater, than the duration of each of the data pulses 1010.

Each command can comprise a predetermined number of bits, series of bits, even series of bytes. Correspondingly, each series of data pulses 1010, even each succession of series of data pulses 1010, comprises a determined number of data pulses 1010. In this manner, the pulse succeeding this predetermined number of data pulses 1010 can be, on the one hand, configured by the first circuit to make it possible for the interpretation and the execution, even the validation, of the command transmitted, on the other hand, directly (i.e. from the start of the transmission thereof to the second circuit) interpreted by the second circuit as an order of interpretation and of execution, even of validation, of the command transmitted.

As discussed above, the interpretation and the execution of the command can comprise an update of the screen 23 of the display module 140.

The duration of pulses depends on the start-up time of the second circuit 2 after increasing the supply, and on the technology used for the non-volatile storage support 21.

For example, a flash memory with a start-up duration of around 1 ms (millisecond) and is capable of storing the value of a bit in less than 1 ms. The following can be had:

t2=3 ms;
t1=4 ms; and
t6≥5 ms,
where t2 is the duration of a data pulse 101 of a bit equal to 1, t1 is the duration of a data pulse 101 of a bit equal to 0, and t6 is the duration of a processing pulse 105.

The invention is not limited to the embodiments described above and extends to all embodiments covered by the claims.

REFERENCES

100: Device, for example, bank card;
110: Radio antenna
110a: A radio antenna;
110b: Another radio antenna;
120: Electronic chip;
130: Energy conversion module;
140: Display module;
200: Portable communication device;
210: Mobile application;
220: Electromagnetic signal;
300: Manual transmission of data by the user;
400: Communication device, computer;
500: Communication network internet;
600: IT server, bank server.

The invention claimed is:

1. A device comprising a physical support and, supported by said support, at least one electronic chip comprising at least one memory module and at least one processor configured to implement at least one computer program contained in the at least one memory module, said computer program being configured to produce at least one result from data, said device comprising at least one display module configured to display said at least one result and at least one radio antenna configured to receive at least one electromagnetic signal, said display module being configured to receive electrical supply from said at least one electromagnetic signal, wherein the data comprise at least one item of data called static, stored in a non-transient memory and at least one item of data called dynamic, circulating in a transient memory, wherein said at least one item of dynamic data is received by said device through the at least one electromagnetic signal comprising said at least one item of dynamic data, and wherein the at least one electromagnetic signal is received by said device from at least one communication device.

2. The device according to claim 1, wherein said at least one result is an item of data displayed on the device, and wherein the device is a chip card or related.

3. The device according to claim 1, wherein said at least one result is an encrypted security code, and wherein the device is a bank card.

4. The device according to claim 1, wherein said item of dynamic data comprises at least one item of data, taken from among: a time stamping, a cryptogram, a token, a unit of value.

5. The device according to claim 1, wherein said at least one electronic chip is electrically supplied from said at least one radio antenna.

6. The device according to claim 1, wherein said at least one electronic chip is electrically supplied from an energy conversion module, and wherein said energy conversion module is electrically supplied by said at least one radio antenna.

7. The device according to claim 6, wherein said at least one electronic chip comprises said energy conversion module.

8. The device according to claim 1, wherein said at least one display module is electrically supplied through said at least one electronic chip.

9. The device according to claim 1, wherein said at least one display module is electrically supplied from an energy conversion module, and wherein said energy conversion module is electrically supplied by said at least one radio antenna.

10. The device according to claim 9, wherein said at least one display module comprises said energy conversion module.

11. The device according to claim 1, wherein the electronic chip and the display module are connected to one another via an electrical connection line and a mass line shared by electronic circuits that constitute the electronic chip and the display module, for the transmission, from the electronic chip to the display module, via the electrical connection line and in reference to the mass line, of at least one series of pulses called data pulses, each data pulse making it possible both to electrically supply the display module and to transmit an item of data of a series of data which can be interpreted by the display module, the electronic chip being configured to cut the supply between two successive data pulses, and the display module comprising a non-volatile storage support configured to store the item of data transmitted by each data pulse before the display module is switched off due to power failure.

12. A system comprising at least one device according to claim 1 and at least one communication device configured to emit, sent to the at least one device, the at least one electromagnetic signal configured to supply said at least one device and to transmit at least one item of dynamic data to said at least one device.

13. The system according to claim 12, wherein said at least one communication device is preferably at least one portable communication device taken from among: a smartphone, a tablet, a mobile telephone, a smartwatch, an electronic payment terminal, an RFID reader.

14. The system according to claim 12, wherein a software application is activated on said communication device in order to emit said electromagnetic signal.

15. A method for creating a security code for a confirmation of a bank payment implemented by at least one user from at least one system according to claim 12, from at least one IT server and from at least one communication device in communication with said at least one IT server, said method comprising at least the following steps:
the device is brought to a radiofrequency communication range with at least one communication device, preferably portable, by said at least one user;
the device receives at least one electromagnetic signal emitted by said at least one portable communication device, said at least one display module being configured to receive electrical supply from said at least one electromagnetic signal;
said electronic chip generates, from static data and dynamic data, a security code; and
the device displays said new security code on the display module thereof, wherein said dynamic data is transmitted to said device by said at least one electromagnetic signal.

16. The method according to claim 15, wherein the user transmits to said IT server, said static data and said new security code and wherein the IT server compares said new security code with said static data and dynamic data corresponding to a time stamping.

17. The method according to claim 15, wherein said communication device is taken from among at least: a computer, a smartphone, a tablet.

18. The device according to claim 1, wherein the device does not include electrical storage for the operation of the device.

19. The device according to claim 1, wherein the device is configured to be energized solely by electromagnetic waves.

20. The device according to claim 19, wherein the device does not include a battery or energy storage for the operation of the device.

* * * * *